March 18, 1924.
E. E. CRONENWETH
1,487,317
AUTOMATIC TIRE CHAIN APPLIER
Filed March 31 1922    3 Sheets-Sheet 1
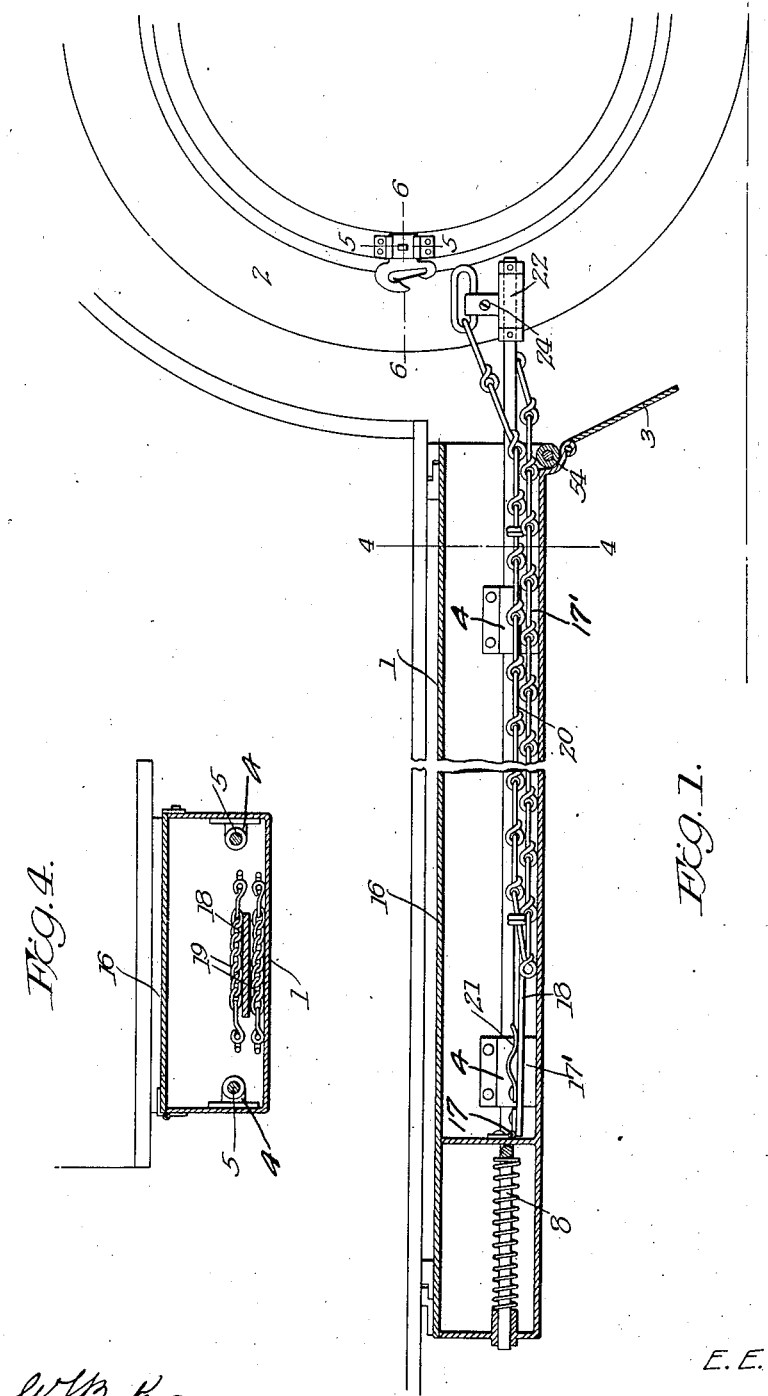
E. E. Cronenweth
INVENTOR
BY Victor J. Evans
ATTORNEY March 18, 1924.  E. E. CRONENWETH  1,487,317
AUTOMATIC TIRE CHAIN APPLIER
Filed March 31, 1922  3 Sheets-Sheet 2
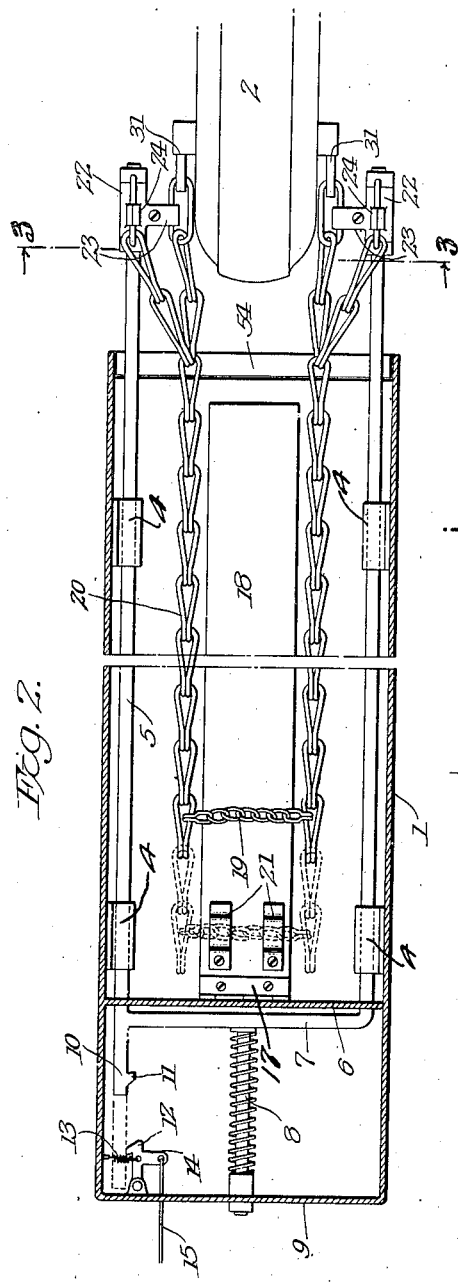
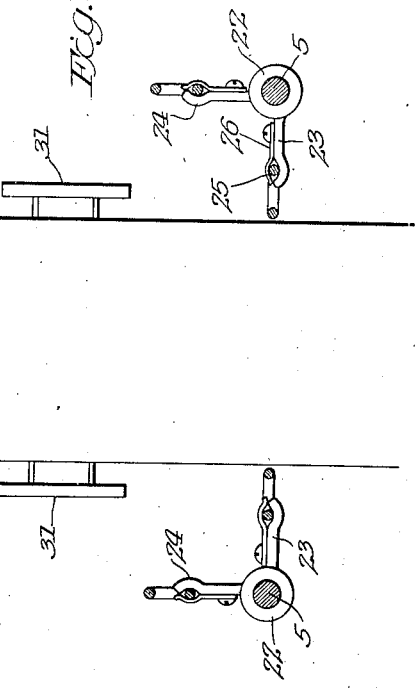
E. E. Cronenweth, INVENTOR
BY *Victor J. Evans* ATTORNEY March 18, 1924.
E. E. CRONENWETH
1,487,317
AUTOMATIC TIRE CHAIN APPLIER
Filed March 31 1922  3 Sheets-Sheet 3
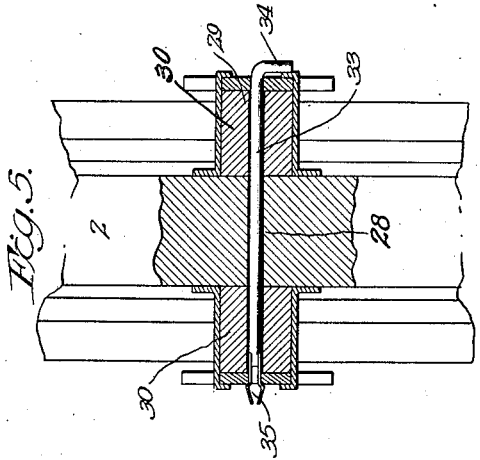
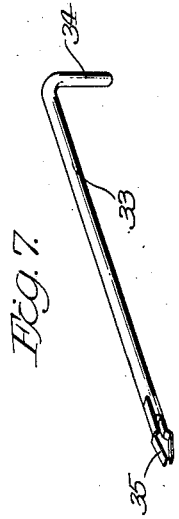
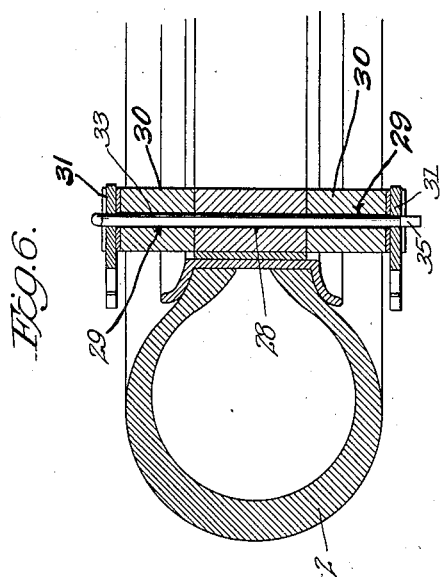
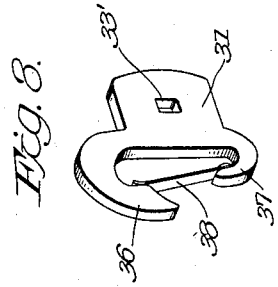
E. E. Cronenweth
INVENTOR
BY Victor J. Evans
ATTORNEY Patented Mar. 18, 1924.

1,487,317

UNITED STATES PATENT OFFICE.

EARL E. CRONENWETH, OF WILKINSBURG, PENNSYLVANIA.

AUTOMATIC TIRE-CHAIN APPLIER.

Application filed March 31, 1922. Serial No. 548,440.

*To all whom it may concern:*

Be it known that I, EARL E. CRONENWETH, a citizen of the United States, residing at Wilkinsburg, in the county of Allegheny and State of Pennsylvania, have invented new and useful Improvements in Automatic Tire-Chain Appliers, of which the following is a specification.

The object of this invention is to produce a means whereby anti-skid chains may be automatically arranged around and clamped on the drive wheels of a machine.

A further object is the provision of a means for automatically applying anti-skid chains to the drive wheels of an automobile chracterized by simplicity in construction and reliability and efficiency in practical use.

To the attainment of the foregoing, the invention consists in the construction, combination and operative arrangement of parts as herein described and definitely claimed.

In the drawings, which accompany and which form part of this application:—

Figure 1 is a side elevation of a sufficient portion of an automobile to illustrate the application of the improvement, the antiskid chain being projected to a position to have the links on one of its ends engaged by the hook on the felly of the drive wheel of the machine, parts being in section and a portion of the hinged plate being broken away.

Figure 2 is a plan view of the construction as disclosed in Figure 1, parts being also in section.

Figure 3 is a sectional view on the line 3—3 of Figure 2.

Figure 4 is a sectional view on the line 4—4 of Figure 1.

Figure 5 is a sectional view on the line 5—5 of Figure 1.

Figure 6 is a sectional view on the line 6—6 of Figure 1.

Figure 7 is a perspective view of the removable hook retaining pin.

Figure 8 is a similar view of the hook.

In the drawings, like reference characters designate similar parts throughout the several views.

In carrying out my invention I employ two box-like members, one on the under face of each of the running boards of the automobile, forward of the drive wheels of the said machine. However, in the drawings, I have shown only one box and one traction wheel.

Referring now to the drawings in detail, the numeral 1 designates a substantially rectangular box which, as stated, is secured on the running board of an automobile directly forward of the traction or power wheel 2 thereof. The box may be comparatively narrow and is, under no conditions of a greater width than that of the running board. In every instance the rear end of the box, that is the end thereof next the wheel 2 is open, the said open end, however, being closed by a hinged door 3. The box has secured to its inner sides guide sockets 4 through which pass the parallel arms 5 of a substantially U-shaped member or yoke. The arms 5 of the yoke also pass through openings in a partition 6 which is arranged a suitable distance from the front closed end of the box, and the connecting element 7 for the arms 5 of the yoke is designed to contact with the partition when the outer ends of the yoke are projected through the open end of the box, as disclosed by the drawings. The yoke, however, is normally housed in the box 1 but is influenced to project the outer ends of the arms 5 thereof through the said box by a spring 8. The spring, as disclosed by the drawings is disposed between the connecting element 7 for the arms of the yoke and the closed end 9 of the box 1, both the members 7 and 9 being provided with suitable bosses or sockets for the end convolutions of the spring 8. The yoke has its portion 7, in a line with one of its arms 5 formed with an extension 10 provided with an inwardly directed lug or beak 11 designed to be engaged by a catch or trigger member 12 influenced to such engagement by a spring 13. The trigger member has an outstanding lug or finger 14 to which is connected a flexible element or light rod 15, the same passing through an opening in the end 9 of the box 1, and leading to the dash of the machine. It will be obvious that a pull upon the element 15 will swing the trigger 12 from engagement with the finger or lug 11, thus releasing the yoke and permitting the spring 8 to project the ends of the arms 5 outward through the box. This pressure is sufficient to unlatch the door 3 to swing the same to open position. It will be also noted, especially by reference to Figure 3 of the drawings, that the arms 5 of the yoke are disposed a considerable distance outward of the sides of the wheel 2.

The box 1, in addition to its open outer or rear end may have, as stated, one of its sides open or, as disclosed in Figure 4 of the drawings, the said box may be provided with an open top closed by a suitable hinged cover 16, it being necessary that access be obtained to the interior of the box as will presently be apparent.

Hinged, as at 17, centrally on the partition 6 there is a longitudinally extending plate 18. The plate rests on cleats 17'. The plate 18 is of a length almost equalling the distance between the partition 6 and the open end of the box 1, the said plate, however, having its ends spaced from both the partition and the said open end of the box. The elevated plate is designed to provide a spacer or separating element for the cross chains 19 of the anti-skid chain 20. In arranging the anti-skid chain 20 in the box, the same is centrally folded upon itself so that one of the leads is disposed in contacting engagement with the bottom of the box, the cross chains thereof being arranged beneath the plate 18, and the upper lead may rest on the lower lead, but the cross chains 19 thereof are disposed over the top of the plate 18. On the top of the plate 18 there are spring clips 21 that engage the cross chain 19 nearest the partition 6.

On the outer ends of the arms 5 of the yoke there are journaled sleeves 22 respectively. Each sleeve 22 is provided with right angularly arranged fingers 23 and 24 respectively. Each of the fingers adjacent to its outer end has an inwardly depressed or rounded portion over which is arranged the outwardly rounded portions 25 of flat springs 26, the inner ends of the said springs being secured to the respective fingers. The fingers and springs provide supporting clips for the end links of the respective lower and upper leads of the anti-skid chains 20, and when the yoke is spring influenced to an outward position, as disclosed in Figures 1 and 2 of the drawings, the horizontally disposed fingers 23 of the respective sleeves 22 sustain the said links in close proximity to the sides of the wheel 2, the end links engaged by the fingers 24 being held a considerable distance outwardly from the sides of the said wheel.

The felly 27 of the wheel 2 has a comparatively small transverse opening therethrough. This opening, 28, is designed to align with openings 29 in spacer blocks 30. On the outer end of each of the spacer blocks there is arranged the body portion 31 of a hook member. The body 31 of each of the hook members has an opening 33' therethrough.

The numeral 33 designates the pin which is employed for removably securing the hooks and blocks on the felly 27. The pin 33 has one of its ends arranged at a right angle to its body or main portion to provide the same with a handle 34, while its opposite end is centrally bifurcated and the arms provided by the bifurcation bent upon themselves to form the said end with an arrow head 35. It is, of course, to be understood that the pin 33 is of metal and that the arms which constitute the arrow head 35 have a tendency to spring away from each other. The pointed end of the arrow head, however, may be readily inserted first through one of the openings 33' in the body 31 of one of the hooks, thence through the openings 29 in one of the blocks 30, through the opening 28, through the opening in the second block and through the opening 33' in the body of the second hook. The shoulders of the arrow head will then contact with the outer flat face of the body 31 of one hook, the angle handle 34 contacting with the outer face of the other hook, and in this manner it will be seen that the hooks and blocks are effectively but removably secured on the felly of the wheel. Each body 31 has one of its outer corners formed with a curved extension providing a beak 36. The opposite outer corner of the body of each of the hooks is formed with a rounded finger 37, and to the inner edge of this finger there is secured one end of a flat spring 38, the said spring having its opposite end in contacting engagement with the inner edge of the beak 36.

Particular attention is now directed to Figures 1 and 2 of the drawings. The operator has pulled the element 15 to release the trigger 12 to permit the spring 8 projecting the arms of the yoke through the rear and open end of the box or housing 1, bringing the angle fingers on the sleeves 22 and the end links of the chain engaged thereby to the position as above described. The motor of the automobile is started so that the wheels 2 will turn in the natural direction to propel the machine forwardly. This turning of the wheel will bring the beaks 36 of the hooks to engage the end links supported on the horizontally disposed fingers 23, and as the wheel further revolves, the lower lead of the chain will be arranged around the tread of the wheel. A pulling on the lower lead of the chain will release the cross chain 19 from its engagement by the spring clips 21, so that the chain is gradually drawn outwardly from the housing. Such pull upon the chain will cause the sleeves 22 to turn on the arms 5 of the yoke, thus bringing the fingers 24 to horizontal position. It is to be understood that suitable means may be employed for limiting the swinging of the yoke and consequently the swinging of the fingers thereof. The finger 24 being now at an inward position with respect to the sides of the wheel 2, holds what was the upper end link of the chain in a position whereby the same will be engaged by the beaks of the hooks, and in this manner it will be seen that the chain is automatically brought to surround the wheel. It is to be further noted that the projected arms of the yoke are not in the path of contact with either the wheel or the hooks 36, so that it is not necessary for the operator to leave the machine to move the yoke to the housed position, which is especially desirable, inasmuch as the anti-skid chains are only employed in inclement weather, and therefore the driver or the occupant of the car need not expose himself to such weather. It may be found desirable to permit of the free movement of the chain on the tire of the wheel, in which instance, the locking pin 33 is withdrawn from engagement with the hooks, blocks and felly of the wheel, the pin and blocks being held by the operator, the hooks still engaging the links of the chain.

The box 1 at its lower outer or open corner has journaled transversely therein an anti-frictional roller 54 over which the lower lead of the chain travels when the same is being wound around the periphery of the wheel 2.

It is believed that the foregoing description, when taken in connection with the drawings will fully set forth the construction and advantage of the improvement to those skilled in the art to which such inventions relate, but it is thought necessary to state that the nature of the invention is such as to render the same susceptible to change not only in size, proportion and material employed, but to other modifications than those herein disclosed, and therefore it is to be understood that I am entitled to all such changes as fall within the scope of what I claim.

Having described the invention, I claim:—

1. The combination with an automobile, of housings supported forward of the drive wheels of the automobile, a folded chain in each housing, clips retaining the chains in one position in the housings, spring influenced slidable means in the housings, turnable means on the outer ends of said last mentioned means having angle fingers which engage the end links of the chains, latching means for sustaining the slidable means in the housings against the influence of the spring means therefor, means connected with and operable remotely from the housings for operating the latching means, means locked on the sides of the wheels in the path of engagement with the end links on one of the leads of the chains for latching said links thereto when the wheels are turned and the chains are projected to draw the chains around the treads of the wheels and to influence the turnable means to bring the end links of the second lead of the chain to engagement thereby for securing the chains on the wheels, and means for releasing the said last mentioned means from engagement with the wheels.

2. The combination with an automobile, of housings supported forward of the drive wheels of the automobile, a centrally folded anti-skid chain in each housing, means in the housings spacing the leads of the chains, clips on said means engaging the chains, spring influenced means arranged for slidable movement through the housings, turnable means on said spring influenced means having right angle fingers to engage the end links of the leads of the chains to arrange the respective end links vertically and horizontally adjacent to the sides of the wheels when the said spring influenced means projects the chains through the housings, means latching the spring influenced means in the housings, releasing means for said latching means, means on the sides of the wheels to engage the said horizontally disposed links to draw the chains around the treads of the wheels, when the wheels are turned, and to turn said turnable means to bring the end links of the second lead of the chains to horizontal position and in the path of engagement with said last mentioned means whereby to secure the chains on the wheels.

3. The combination with an automobile, of housings removably secured on the automobile forward of the drive wheels thereof, each of said housings having a rear open end, doors normally closing said ends, yokes slidable in bearings in the respective housings, spring means influencing the yokes to project the ends thereof through the open ends of the housings, means latching the yokes in the housings, operating means for releasing said latching means, an elevated plate in each of the housings disposed between the arms of the yoke, and anti-skid chains designed each to be centrally folded over one of the plates, spring clips on each plate engaging one of the cross chains of the respective anti-skid chain, a sleeve turnable on the outer end of each arm of the yoke, angle fingers on each sleeve to engage the end links of the respective leads of the chains to sustain the respective end links vertically and horizontally adjacent to the sides of the wheel when the chains are projected, hooks having spring closed beaks locked to the sides of the felly of the wheels and the beaks thereof in position to receive the horizontally disposed links of the chains and whereby, when the wheels are turned, the said hooks will engage said links and first draw one of the leads of the chains out of the housings and around the wheels, and in so doing turn the sleeves to bring the second arms thereof to horizontal position and to arrange the links engaged thereby in position to be engaged by the hooks when the wheels have approximately turned one revolution for securing the chains on the wheels, and the locking means for the hooks being removable.

In testimony whereof I affix my signature.

EARL E. CRONENWETH.